United States Patent [19]
Takatsuka

[11] Patent Number: 6,149,520
[45] Date of Patent: Nov. 21, 2000

[54] VIDEO GAME METHOD AND APPARATUS FOR EFFECTING CHARACTER MOVEMENT AND BALL CONTROL DETERMINATION

[75] Inventor: Shingo Takatsuka, Tokyo, Japan

[73] Assignee: Konami Co., Ltd., Hyogo-ken, Japan

[21] Appl. No.: 08/917,002

[22] Filed: Aug. 20, 1997

[30] Foreign Application Priority Data

Aug. 21, 1996 [JP] Japan ................................ 8-238606

[51] Int. Cl.[7] .................................................. A63F 9/24
[52] U.S. Cl. ........................................... 463/4; 273/108.1
[58] Field of Search .......................... 463/4, 7; 273/108.1

[56] References Cited

U.S. PATENT DOCUMENTS 5,435,554  7/1995  Lipson .
5,863,248  1/1999  Mine et al. .................................. 463/4

FOREIGN PATENT DOCUMENTS 0758117    7/1996  European Pat. Off. .
WO96/22581 7/1996  WIPO ....................................... 463/4

OTHER PUBLICATIONS

Greg Booker: "FOFA Soccer '96", 'ONLINE!, 1996, pp. 1–5, CP002130570, Retrieved from the Internet: <URL:www.gamesdomain.com/gdreview/zones/reviews/pc/jan/fifa96.html>, 'retrieved on Feb. 15, 2000! *page 4, paragraph 2–paragraph 5*.

Hugo Foster: "Football Pro '96", 'ONLINE!, May, 1, 1996 (May 1, 1996), page 1, XP002130571, Retrieved from the Internet: <URL:www.gamespot.com/sports/football/printable$_{13}$review.html>, 'retrieved on Feb. 15, 2000! *page 1, paragraph 2*.

*Primary Examiner*—Valencia Martin-Wallace
*Assistant Examiner*—John Paradiso
*Attorney, Agent, or Firm*—Jordan and Hamburg LLP

[57] ABSTRACT

A video game method and apparatus provides a video soccer game between two soccer teams. A game player of the video game operates a manual controller with a directional controller and a non-directional controller to control a player's game character of one of the soccer teams. In the video soccer game, it is determined, in response to operation of the non-directional controller, whether the player's game character is positioned in front of, on the side of, or behind an opponent game character carrying a soccer ball and belonging to the other soccer team. The player's game character advances toward and automatically tackles the opponent game character to capture the soccer ball depending on the detected relative position between the game character and the ball.

40 Claims, 7 Drawing Sheets

VIDEO GAME METHOD AND APPARATUS FOR EFFECTING CHARACTER MOVEMENT AND BALL CONTROL DETERMINATION

BACKGROUND OF THE INVENTION

1. Field of the Invention

The present invention relates to a video game machine for playing a video ball game and a storage medium which stores a video ball game program, and more particularly to a video game machine for playing a video ball game such as a soccer game, a basketball game, etc. and a storage medium which stores a video ball game program such as a video soccer game program, a video basketball game program, etc.

2. Description of the Prior Art

There are known video soccer game machines which display a virtual ball game space representing the field of a soccer stadium and two soccer teams on a video display screen. The game player of such a soccer game machine controls the displayed game characters representing soccer players of one of the two soccer teams to play a soccer game with the other soccer team in the virtual soccer field.

The soccer game machine has a manual controller that is operated by the game player to control the game characters of the soccer game assigned to the game player. The manual controller has, among other keys, directional keys for moving a player's game character in the virtual soccer field, kick buttons, i.e., a shoot button and a pass button, for kicking the soccer ball while the player's game character is dribbling the ball, a tackle button for causing the game character to tackle one of the game characters belonging to the opponent soccer team while the opponent game character is dribbling the ball.

For the game player to control the player's game character to capture the soccer ball from an opponent game character, the game player operates the manual controller as follows: The game player operates the directional keys to move the player's game character to a position that is spaced a predetermined tackle distance from the opponent game character, i.e., a distance at which the player's game character can tackle the opponent game character. Then, the game player presses the tackle button while pressing one of the directional buttons which corresponds to a direction in which the game player wants the player's game character to tackle the opponent game character. In the virtual soccer field, the player's game character tackles the opponent game character and possibly captures the soccer ball from the opponent game character.

In the conventional video soccer game machines, the tackle distance referred to above is set to a critical value below which the player's game character will immediately come into contact with the opponent game character. Therefore, moving the player's game character toward the opponent game character and pressing the tackle button while orienting the player's game character in a direction to tackle the opponent game character at the tackle distance requires a considerable amount of skill on the part of the game player. It is highly difficult or even impossible for those game players who are not accustomed to playing the video soccer game or who are not well trained to operate the manual controller, to cause the player's game character to tackle the opponent game character. When unskilled game players play the conventional video soccer game, they are unable to control the player's game character to capture the soccer ball from the opponent game character, and hence cannot enjoy the video soccer game sufficiently.

SUMMARY OF THE INVENTION

It is therefore an object of the present invention to provide a video game machine which allows game players having various levels of game playing skill to enjoy a video ball game sufficiently.

Another object of the present invention is to provide a method of processing image data in a video game machine to allow game players having various levels of game playing skill to enjoy a video ball game sufficiently.

Still another object of the present invention is to provide a computer-readable storage medium which stores a video ball game program.

According to the present invention, a video game machine is operated by a game player for playing a video ball game in a virtual ball game space between two ball game teams with a game player controlling a game character of at least one of the, two ball game teams. The video game machine has relative position detecting means for detecting a relative position between the game character controlled by the game player and a ball in response to a ball capture start signal, and movement control means for causing the game character controlled by the game player to capture the ball depending on the relative position between the game character and the ball as detected by the relative position detecting means.

The relative position detecting means detects a relative distance between the game character and the ball and a direction of the game character with respect to a direction in which the ball moves, and the movement control means causes the game character to capture the ball depending on the relative distance and the direction of the game character as detected by the relative position detecting means.

The movement control means causes the game character to capture the ball in a first pattern if the relative distance comprises a predetermined distance and the direction of the game character is angularly deviated from the direction in which the ball moves by a first angle, and causes the game character to capture the ball in a second pattern different from the first pattern if the relative distance comprises the predetermined distance and the direction of the game character is angularly deviated from the direction in which the ball moves by a second angle different from the second angle.

The movement control means causes the game character to capture the ball from a game character belonging to the other of the two ball game teams if the game character belonging to the other of the two ball game teams is present near the ball.

The video game machine further comprises ball state detecting means for detecting whether the ball is in air, and the movement control means causes the game character to capture the ball depending on a result detected by the ball state detecting means.

According to the present invention, there is also provided a method of processing image data in a video game machine for playing a video ball game in a virtual ball game space between two ball game teams with a game player controlling a game character of at least one of the two ball game teams. According to the method, a relative position between the game character controlled by the game player and a ball is detected in response to a ball capture start signal, and the game character controlled by the game player is caused to capture the ball depending on the detected relative position between the game character and the ball.

According to the present invention, a storage medium stores a video ball game program for playing a video ball game in a virtual ball game space between two ball game teams with a game player controlling a game character of at least one of the, two ball game teams. According to the video ball game program, a relative position between the game character controlled by the game player and a ball is detected in response to a ball capture start signal, and the game character controlled by the game player is caused to capture the ball depending on the detected relative position between the game character and the ball.

According to the video ball game program stored in the storage medium, a relative position between the game character controlled by the game player and a game character belonging to the other of the two ball game teams and carrying a ball may be detected in response to a ball capture start signal, and the game character controlled by the game player may be caused to capture the ball depending on the detected relative position between the game character controlled by the game player and the game character carrying the ball.

According to the present invention, there is also provided a video game machine for playing a video ball game in a virtual ball game space between two ball game teams with a game player controlling a game character of at least one of the two ball game teams. The video game machine has relative position detecting means responsive to a ball capture start signal, for detecting a relative position between the game character controlled by the game player and a game character belonging to the other of the two ball game teams if the game character belonging to the other of the two ball game teams is carrying a ball, and movement control means for causing the game character controlled by the game player to capture the ball depending on the relative position, as detected by the relative position detecting means, between the game character controlled by the game player and the game character which is carrying the ball.

According to the video ball game program stored in the storage medium, a relative position between the game character controlled by the game player and a game character belonging to the other of the two ball game teams if the game character belonging to the other of the two ball game teams is carrying a ball may be detected in response to a ball capture start signal, and the game character controlled by the game player may be caused to capture the ball depending on the detected relative position between the game character controlled by the game player and the game character which is carrying the ball.

Since the relative position between the game character controlled by the game player and the ball or game character belonging to the other of the two ball game teams and carrying the ball is detected, and the game character controlled by the game player is automatically controlled to capture the ball depending on the detected relative position, the game player can enjoy the video ball game well even if the game player is not sufficiently skilled to operate a manual controller to control the game character.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
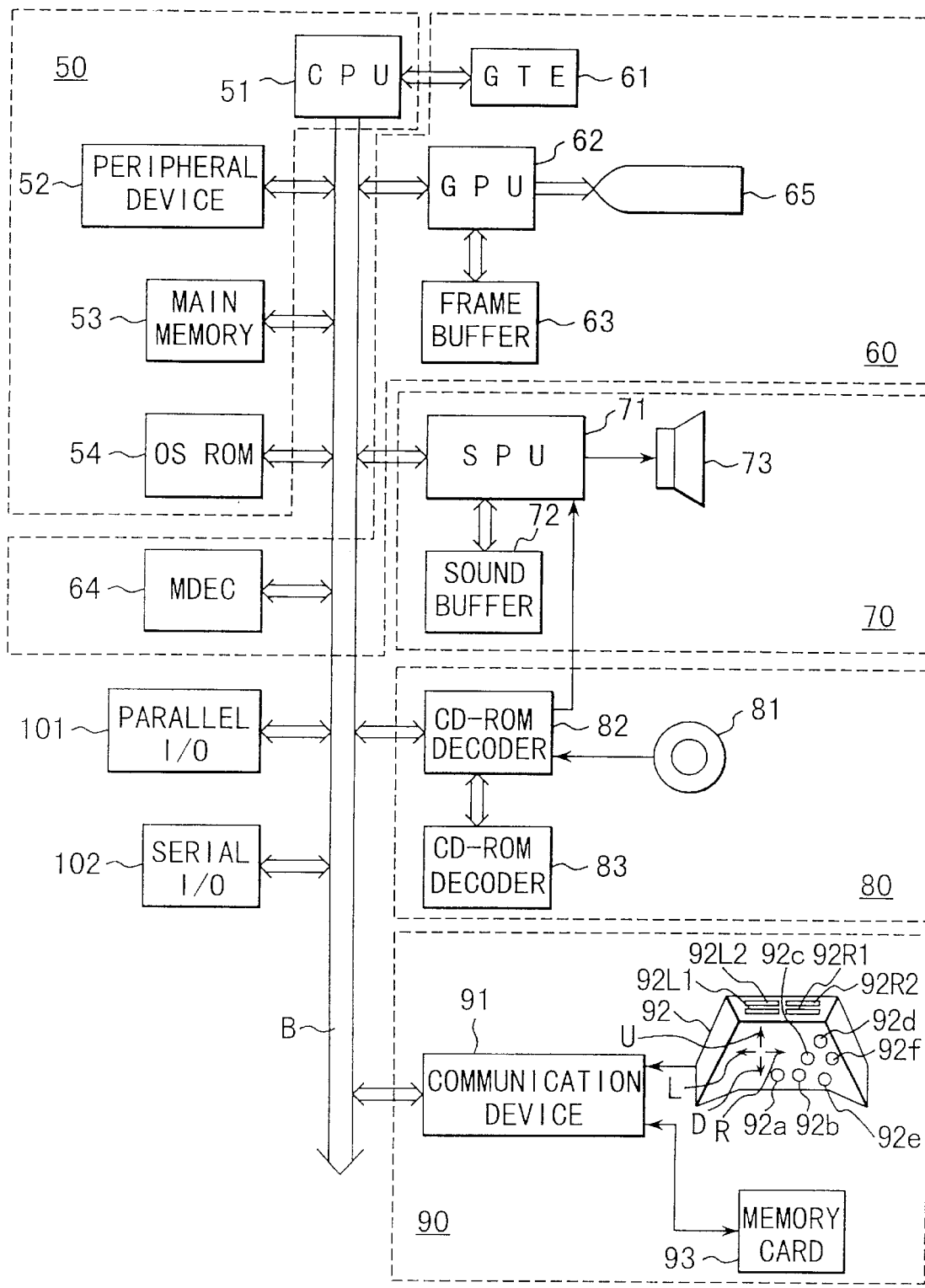
FIG. 1 is a block diagram of a video game machine according to the present invention.

FIG. 1 shows in block form a video game machine according to the present invention. The video game machine comprises an image processing system as disclosed in Japanese laid-open patent publication No. 8-212377. The image processing system displays a video ball game such as a soccer game which can be played by a user, i.e., a game player, when it reads a video ball game program from computer-readable storage medium such as an optical disk, e.g., a CD-ROM, and executes the video ball game program.

As shown in FIG. 1, the image processing system generally comprises a control system 50 for controlling the image processing system in its entirety, a graphic system 60 for handling image data, a sound system 70 for handling sound data, an optical disk controller 80 for reading data from a CD-ROM and generating codes from the read data, a communication controller 90 for controlling application of user's commands and stored game settings, and a main bus B interconnecting these systems and controllers.

The control system 50 includes a main memory 53 such as a 2-Mbyte RAM for storing three-dimensional image data read from a CD-ROM. The graphic system 60 includes a frame buffer 63 for storing a color information table, texture pattern information, semitransparency ratio designating data, etc. as characteristic data indicated for each of polygons of images to be displayed, and a geometry engine (GTE) 61 as a coordinate transforming means for converting three-dimensional image data into two-dimensional image data through perspective transformations. The control system 50 also includes a central processing unit (CPU) 51 as a graphic command generating means for generating packet graphic commands for respective polygons by combining the two-dimensional image data with information that specifies characteristics of the polygons. The graphic system 60 also includes a graphics processing unit (GPU) 62 for generating and storing two-dimensional image information based on characteristic data designated by the generated graphic commands into a frame buffer 63 such as a 1-Mbyte frame buffer, and a video output unit 65 such as a display unit for reading two-dimensional image information from the frame buffer 63 in synchronism with a television synchronizing signal and displaying the two-dimensional image information on its display screen.

The control system 50 further includes a peripheral device controller 52 for controlling interrupts, time control processes, and data transfer according to memory control direct memory access (DMA), and a ROM 54 such as a 512-Kbyte ROM for storing an operating system for controlling the main memory 53, the graphic system 60, and the sound system 70.

The CPU 51 may comprise a 32-bit RISC (Reduced Instruction Set Computer) CPU, for example, and serves to control the image processing system as a whole by executing the operating system stored in the ROM 54. The CPU 51 has a command cache memory and a scratch pad memory, and effects real-memory management.

The GTE 61 comprises a coordinate-calculating coprocessor for effecting coordinate transformations on image data stored in the main memory 53. The graphic system 60 further includes an image decoder (MDEC) 64 for decoding image data that have been compressed and encoded by orthogonal transformations such as discrete cosine transformations.

The GTE 61 has a parallel calculating function for carrying out a plurality of calculations parallel to each other. The GTE 61 serves as a coprocessor for the CPU 51 and effects at high speeds coordinate transformations such as perspective transformations, light source calculations by calculating inner products of normal vectors and light source vectors, and calculations of matrices and vectors in the fixed-point representation, in response to calculation requests from the CPU 51.

Specifically, when the GTE 61 carries out calculations for a flat shading process for displaying each triangular polygon with the same color, the GET 61 can effect coordinate transformations for a maximum of about 1500 thousand polygons per second. The image processing system, therefore, reduces the burden on the CPU 51 and can effect coordinate transformations at high speed. Each of the polygons is a minimum graphic unit used to construct three-dimensional objects on the display screen of the display unit, and may have a polygonal shape such as a triangular shape, a quadrangular shape, or the like.

The GPU 62 operates according to polygon graphic commands from the CPU 51 to generate and store polygons, etc. into the frame buffer 63. The GPU 62 is capable of generating a maximum of about 360 thousand polygons per second. The GPU 62 has a two-dimensional address space independent of the CPU 51, and the frame buffer 63 is mapped onto the two-dimensional address space.

The frame buffer 63 comprises a so-called dualport RAM for simultaneously transferring graphic data from the GPU 62 or data from the main memory 53, and reading data from itself for display.

The frame buffer 63 has a 1-Mbyte storage capacity, for example, as described above, and stores a matrix of 1024 horizontal pixels×512 vertical pixels each of 16 bits.

Data contained in any arbitrary display area of the frame buffer 63 can be outputted to the video output unit 65.

The frame buffer 63 has, in addition to the display area for storing image data to be outputted to the video output unit 65, a CLUT area (second area) for storing a color lookup table (CLUT) to be referred to when the GPU 62 generates polygons, and a texture area (first area) for storing texture data to be mapped into polygons that are generated by the GPU 62. The CLUT area and the texture area are dynamically variable as the display area varies. The frame buffer 63 allows image data stored in the display area to be accessed while they are being displayed and also can transfer data in a quick DMA mode between itself and the main memory 53.

The GPU 62 is capable of effecting, in addition to the flat shading process, a Gouraud shading process for interpolating the colors of vertices of polygons into colors in the polygons, and a texture mapping process for mapping texture data stored in the texture area onto the polygons.

For carrying out the Gouraud shading process or A the texture mapping process, the GTE 61 is able to effect coordinate calculations for a maximum of about 500 thousand polygons per second.

The MDEC 64 is controlled by the CPU 51 to decode image data of still images or moving images which has been read from the CD-ROM and stored in the main memory 53, and store decoded image data back into the main memory 53. Specifically, the MDEC 64 can effect inverse discrete cosine transforms (IDCTS) at high speed to expand compressed data read from the CD-ROM, the data being compressed according to a color still image compression standard (so-called "JPEG") or a moving image compression standard (so-called "MPEG").

The decoded image data is stored through the GPU 62 into the frame buffer 63 for use as background images for images that are generated by the GPU 62.

The sound system 70 comprises a sound processing unit (SPU) 71 for generating music sounds, effect sounds, etc. according to commands from the CPU 51, a sound buffer 72 having a storage capacity of 512 Kbytes, for example, for storing sound data such as of voices, music sounds, etc. and sound source data read from the CD-ROM, and a loudspeaker 73 for outputting music sounds, effect sounds, etc. generated by the SPU 71.

The SPU 71 has an ADPCM decoding function for decoding sound data which has been encoded as a 4-bit differential signal from 16-bit sound data by ADPCM (adaptive differential pulse-code modulation), a reproducing function for reproducing sound source data stored in the sound buffer 72 into effect sounds, and a modulating function for modulating and reproducing sound data stored in the sound buffer 72. The SPU 71 is capable of automatically converting operation parameters with looping and time coefficients, has an ADPCM source capable of producing 24 voices, and operates under the control of the CPU 51. The SPU 71 manages an address space of its own onto which the sound buffer 72 is mapped, and transfers ADPCM data from the CPU 51 to the sound buffer 72, and directly transfers key-on/key-off and demodulation information for reproducing the data.

The sound system 70 thus constructed can be used as a so-called sampling sound source for generating music sounds, effect sounds, etc. based on the data stored in the sound buffer 72.

The optical disk controller 80 comprises a disk drive 81 for reproducing a video ball game program and data recorded on an optical disc which typically comprises a CD-ROM, a decoder 72 for decoding the program and data which have been recorded together with an error correcting code, and a buffer 83 having a storage capacity of about 32 Kbytes for temporarily storing reproduced data from the disk drive 81. The optical disk controller 80 supports various disk formats including CD-DA, CD-ROM, XA, etc. The decoder 82 also serves as part of the sound system 70.

Sound data recorded on a disk played back by the disk drive 81 may be ADPCM data such as CD-ROM or XA ADPCM data, or PCM data in the form of digital sound signals converted from analog signals.

If the recorded sound data comprises ADPCM data in the form of a 4-bit differential signal encoded from 16-bit sound data, for example, then the sound,data is error-corrected and decoded by the decoder 82, and the decoded sound data is supplied to the SPU 71, which converts the digital sound data into analog sound data that are supplied to the loudspeaker 73.

If the recorded sound data comprises 16-bit PCM digital data, for example, then the sound data is decoded by the decoder 82, and the decoded sound data is supplied to the SPU 71. The sound data is mixed with an output signal from the SPU 71, and the mixed sound data is transmitted through a reverberation unit which generates a final audio output signal.

The communication controller 90 comprises a communication control device 91 for controlling communications with the CPU 51 through the main bus B, a manual controller 92 for entering commands from the game player, and a memory card 93 for storing game settings and results.

The manual controller 92 serves as an interface for transmitting the will of the game player to the application, i.e., the soccer game played on the video game machine, and has various keys described below. The manual controller 92 is controlled by the communication control device 91 to transmit key states about 60 times per second to the communication control device 91 according to a synchronous communication process. The communication control device 91 then transmits the key states from the manual controller 92 to the CPU 51. The manual controller 92 has two connectors and a multiple-pin tap. Therefore, a number of manual controllers 92 can be connected to the video game machine. Commands from the game player are supplied through the manual controller 92 to the CPU 51, which effects various processing operations based on the supplied commands according to the video ball game program.

The manual controller 92 has a cross key comprising a left key L, a right key R, an up key U, and a down key D, a first left button 92L1, a second left button 92L2, a first right button 92R1, a second right button 92R2, a start button 92a, a select button 92b, a first button 92c, a second button 92d, a third button 92e, and a fourth button 92f. The cross key allows the game player to give up, down, left, and right direction commands to the CPU 51. When the game player presses the start button 92a, it instructs the CPU 51 to start the video ball game program that is read and loaded from a CD-ROM, for example, in the disk drive 81 into the main memory 53. The select button 92b permits the game player to make and indicate various selections with respect to the video ball game program loaded from the CD-ROM into the main memory 53, to the CPU 51.

When it is necessary store settings of the game being executed or results of the game at the end of the game or while the game is in progress, the CPU 51 transmits the data of the settings or results to the communication control device 91, which stores the data into the memory card 93. The memory card 93 is connected to the communication control device 91, but not to the main bus B, and hence can be attached and detached while the video game machine is energized. This allows various game settings and results to be stored in a plurality of memory cards 93.

The image processing system shown in FIG. 1 also has a 16-bit parallel input/output (I/O) port 101 connected to the main bus B, and an asynchronous serial input/output (I/O) port 102 connected to the main bus B. The parallel input/output (I/O) port 101 allows the video game machine to be connected to peripheral devices. The serial input/output (I/O) port 102 allows the video game machine to communicate with another video game machine.

The main memory 53 is required to transfer a large amount of image data at high speed between itself and the CPU 62, the MDEC 64, and the decoder 82 when reading the video ball game program, displaying images, and generating graphic data. To meet such requirements, the image processing system can operate in a DMA data transfer mode for directly transferring data between the main memory 53, the GPU 62, the MDEC 64, and the decoder 82 under the control of the peripheral device controller 52 rather than the CPU 51. This can reduce the burden imposed on the CPU 51 for the transfer of the data, and can transfer the data at high speed.

When the video game machine is turned on, the CPU 51 executes the operating system stored in the ROM 54. When the operating system is executed, the CPU 51, initializes the video game machine as a whole by confirming its operation, and thereafter controls the optical disk controller 80 to read, load, and execute the video ball game program recorded on an optical disk such as a CD-ROM. When the video ball game program is executed, the CPU 51 controls the graphic system 60 and the sound system 70 depending on commands entered by the game player to display images and generate effect sounds and music sounds.

Displaying images on the video output unit 65 is described below.

The GPU 62 displays data stored in an arbitrary rectangular area of the frame buffer 63 on the display screen of the video output unit 65 such as a CRT or the like. The rectangular area will hereinafter be referred to as a "display area". The display area may have a size selected according to a mode that has been selected. For example, when a mode 0 is selected, the display area has a size of 256 (H)×240 (V) (noninterlaced), and when a mode 9 is selected, the display area has a size of 384 (H)×480 (V) (interlaced). Therefore, it is possible to designate a display start position and a display end position independently for horizontal and vertical positions on the display screen. Ranges of values that can be designated for coordinates in different modes are as follows: In modes 0 and 4, horizontal coordinates can be designated in a range from 0 to 276 (coordinates for the horizontal display start position) and in a range from 4 to 280 (coordinates for the horizontal display end position). In modes 8 and 9, horizontal coordinates can be designated in a range from 0 to 396 (coordinates for the horizontal display start position) and in a range from 4 to 400 (coordinates for the horizontal display end position). In modes 0 through 3 and 8, vertical coordinates can be designated in a range from 0 to 240 (coordinates for the vertical display start position). In modes 4 through 7 and 9, vertical coordinates can be designated in a range from 4 to 484 (coordinates for the vertical display end position). Consequently, a minimum displayed image size on the display screen is 4 horizontal pixels×2 vertical pixels (noninterlaced) or 4 pixels (interlaced).

The GPU 62 supports two modes with respect to the number of displayable colors, i.e., a 16-bit direct mode (32768 colors) and a 24-bit direct mode (full colors). The 16-bit direct mode (hereinafter referred to as a "16-bit mode") is a 32768-color display mode. In the 16-bit mode, the number of displayable colors is smaller than in the 24-bit direct mode (hereinafter referred to as a "24-bit mode"). Since the GPU 62 calculates colors with 24 bits for generating polygons and sprites and has a dither function for increasing the number of gradations, it can display images in a quasi-full-color (24-bit color) display mode. The 24-bit mode is a 26777216-color (full-color) display mode. In the 24-bit mode, it is only possible to display image data (bit-map data) transferred to the frame buffer 63, and the function of the GPU 62 to generate polygons and sprites cannot be performed. One pixel has a bit length of 24 bits. However, coordinates and display positions on the frame buffer 63 need to be specified in terms of 16 bits. Specifically, 24-bit image data of 640×480 is handled as image data of 960×480 in the frame buffer 63. It is necessary to establish coordinates for the horizontal display end position as multiples of 8. In the 24-bit mode, therefore, a minimum displayed image size on the display screen is 8 horizontal pixels×2 vertical pixels.

The QPU 62 has various graphic data generating functions as described below. The GPU 62 has a polygon or sprite generating function to generate polygons or sprites whose sizes range from 1×1 dots to 256×256 dots based on a 4-bit CLUT (4-bit mode, 16 colors/polygon, sprite), an 8-bit CLUT (8-bit mode, 256 colors/polygon, sprite), and a 16-bit CLUT (16-bit mode, 32768 colors/polygon, sprite), a polygon generating function to effect a flat shading process for generating polygons and sprites with screen coordinates specified for their vertices and coloring facets of the polygons and sprites with one color, a Gouraud shading process for specifying different colors for the respective vertices and generating gradations for facets of the polygons and sprites, and a texture mapping process for preparing and mapping texture patterns (those texture patterns for use on sprites are called sprite patterns) of two-dimensional image data onto facets of the polygons and sprites, a linear graphic data generating function to generate gradations, and an image transfer function to transfer image data from the CPU 51 to the frame buffer 63. The GPU 62 also has other functions including a function to calculate an average of pixels of an image to make the image semitransparent, an α-blending function to mixing pixel data at a given ratio of α, a dither function to apply noise to boundaries of colors, a graphic clipping function to prevent of display an area beyond a graphic display area, and an offset indicating function to move a graphic display origin depending on the graphic display area.

A coordinate system for generating graphic images is of 11 bits with signs, and has values ranging from −1024 to +1023 along each of X and Y axes. Since the frame buffer 63 has a size of 1024×512, excess values are folded over. The origin of the coordinate system can freely be changed in the frame buffer 63 according to the offset indicating function. Graphic image data are generated and stored into an arbitrary rectangular area in the frame buffer 63 according to the graphic clipping function. The CPU 62 supports texture data of a maximum of 256×256 dots, whose horizontal and vertical values can freely be established.

Image data (texture pattern or sprite pattern) applied to polygons or sprites is stored in a non-display area of the frame buffer 63. A texture pattern or a sprite pattern comprises pages each of 256×256 pixels, and as many pages of a texture pattern or a sprite pattern as permissible by the storage capacity of the non-display area can be stored in the frame buffer 63. A storage capacity equal to 256×256 pixels in the frame buffer 63 is called a "texture page". The location of a texture page is determined by specifying a page number for a parameter in a graphic command for indicating a texture page location (address).

A texture pattern or a sprite pattern has three color modes including a 4-bit CLUT (4-bit mode), an 8-bit CLUT (8-bit mode), and a 16-bit CLUT (16-bit mode). A CLUT is used in the color modes of the 4-bit CLUT (4-bit mode) and the 8-bit CLUT (8-bit mode).

The CLUT comprises 16~256 R, G, B values, which are three primaries representing colors that will finally be displayed, arrayed in the frame buffer 63. The R, G, B values are numbered successively from the left in the frame buffer 63. The numbers allocated to the R, G, B values represent the colors of pixels of a texture pattern or a sprite pattern. A CLUT can be selected for each of polygons or sprites, and it is possible to provide independent CLUTs for all the polygons or sprites. The position where a CLUT is stored in the frame buffer 63 is determined by specifying a coordinate of the left end of the CLUT for a parameter in a graphic command for indicating a CLUT position (address).

The GPU 62 uses a technique known as "frame double buffering" for displaying moving images. According to the frame double buffering, two rectangular areas are used in the frame buffer 63, and while graphic image data is being generated and stored into one of the rectangular areas, graphic image data from the other rectangular area is displayed, and when the storage of the graphic image data is finished, the rectangular areas are switched around to display the stored graphic image data. Therefore, the switching between the graphic image data is not evident on the display displayed. The switching between the rectangular areas of the frame buffer 63 is carried out in a vertical blanking period. Since the GPU 62 can freely establish the rectangular areas for storing graphic image data and the origin of the coordinate system, it is possible to achieve a plurality of buffer areas by moving the rectangular areas and the origin of the coordinate system.

Each of graphic commands comprises a packet which may be specified directly by the CPU 51 or directly by dedicated hardware. If dedicated hardware is used to directly specify a packet, then the packet is of an arrangement which comprises a command format used by the CPU 51, the number of command words, and a tag indicative of a pointer to a next command. Such a packet arrangement allows a plurality of commands, which are placed in contiguous areas in the frame buffer 63, to be connected and executed at once. Graphic commands of such a packet arrangement are transferred by the dedicated hardware, not the CPU 51.

Parameters included in graphic commands are as follows:

CDDE: Command code call option;

R, G, B: Luminance values shared by all vertices;

Rn, Bn, Gn: Luminance values of a vertex n;

Xn, Yn: Two-dimensional coordinates of a vertex n in a graphic space;

Un, Vn: Two-dimensional coordinates of a point in a texture source space which corresponds to a vertex n;

CBA (CULT BASE ADDRESS): Starting address of a CULT; and

TSB (TEXTURE SOURCE BASE): Starting address of a texture page and additional information of a texture type, etc.

For example, a triangle graphic command (command code=1h) comprises a command code including an option, followed by vertex information given as a command argument. The number of arguments and the format vary depending on the option.

Parameters include:

IIP: Type of luminance values;

SIZ: Size of rectangular areas;

CNT: Vertex used;

TME: Whether there is texture mapping or not;

ABE: Whether there is semitransparent process or not; and

TGE: Whether there is multiplication of a texture pattern and luminance values.

For example, when IIP is 0, a triangle is graphically generated (flat shading) with one type of luminance values (R, G, B). When CNT is 0, a triangle is graphically generated with three vertices following the command, and joint triangles, i.e., a quadrangle, are graphically generated with four vertices following the command. When TME is 0, the texture mapping is turned off, and when TME is 1, the texture mapping is turned on. When ABE is 0, the semitransparent process is turned off, and when ABE is 1, the semitransparent process is turned on. The parameter TGE is effective only when the parameter TME is effective. When TGE is 0, a texture pattern and luminance values are multiplied and displayed. When TGE is 1, only a texture pattern is displayed.

A straight line graphic command (command code=2h) comprises a command code including an option, followed by single-point information given as a command argument. The number of arguments and the format vary depending on the option. For example, when IIP is 0, a pixel is graphically generated with a luminance value that is specified, and when IIP is 1, luminance values of two vertices are linearly interpolated by displacing a line segment longitudinally and a pixel is graphically generated. When CNT is 0, a straight line is graphically generated with two end points following the command and graphically generated. When CNT is 1, joined straight lines are graphically generated. When ABE is 0, the semitransparent processing is turned off, and when ABE is 1, the semitransparent processing is turned on. When joined straight lines are to be graphically generated, a terminal end code indicative of the end of the command is required.

A sprite graphic command (command code=3h) comprises a command code including an option, followed by luminance information, a left lower end point of a rectangular area, a left upper end point of a texture source space, a width and height of the rectangular area, which are given as command arguments. The number of arguments and the format vary depending on the option. Since the sprite graphic command processes two pixels simultaneously, a two-dimensional coordinate Un of a point in the texture source space which corresponds to a vertex n has to be set to an even number. Therefore, one low-order bit is meaningless. When TME is 0, the texture mapping is turned off, and when TME is 1, the texture mapping is turned on. When ABE is 0, the semitransparent process is turned off, and when ABE is 1, the semitransparent process is turned on. When TGE (effective only when the parameter TME is effective) is 0, a texture pattern (sprite pattern) and certain luminance values are multiplied and displayed. When TGE is 1, only a texture pattern is displayed. When SIZ is 00, the size of a rectangular area is designated by H in 2 fields. When SIZ is 01, the size of a rectangular area is designated by 1×1. When SIZ is 10, the size of a rectangular area is designated by 8×8. when SIZ is 11, the size of a rectangular area is designated by 16×16.

In the illustrated embodiment, the video ball game program recorded on an optical disk such as a CD-ROM played by the disk drive 81 is a soccer game program for playing a soccer game between a soccer team (player's soccer team) controlled by the game player and a soccer team (opponent soccer team) controlled by the CPU 51 in a game space representing the field of a soccer stadium. While in the soccer game, a plurality of soccer players (a player's game character M in FIG. 3) of the player's soccer team are appropriately controlled by the CPU 51, and the player's game character M, which is closest to the soccer ball B (see FIG. 3), is automatically selected by the CPU 51 and can be controlled by the game player.

The cross keys U, D, L, R of the manual controller 92 are used as directional keys for moving the player's game character M forward, backward, leftward, and rightward in the game space. When the player's game character M keeps the soccer ball B, the first button 92c is used as a throwing button for the player's game character M to throw the ball B from outside of a touch line into the soccer field, and the second and third buttons 92d, 92e are used as kick buttons (pass and shoot buttons) for the player's game character M to kick the ball B. When an either one of soccer players (an opponent game character E in FIG. 3) of the opponent soccer team keeps the soccer ball B and the player's game character M defends, the fourth button 92f is used as a tackle button for the player's game character M to tackle the opponent game character E.

The game characters of the player's soccer team and the game characters of the opponent soccer team are given respective proper names, respective player's numbers, and respective peculiar ability values.

Figure 2:
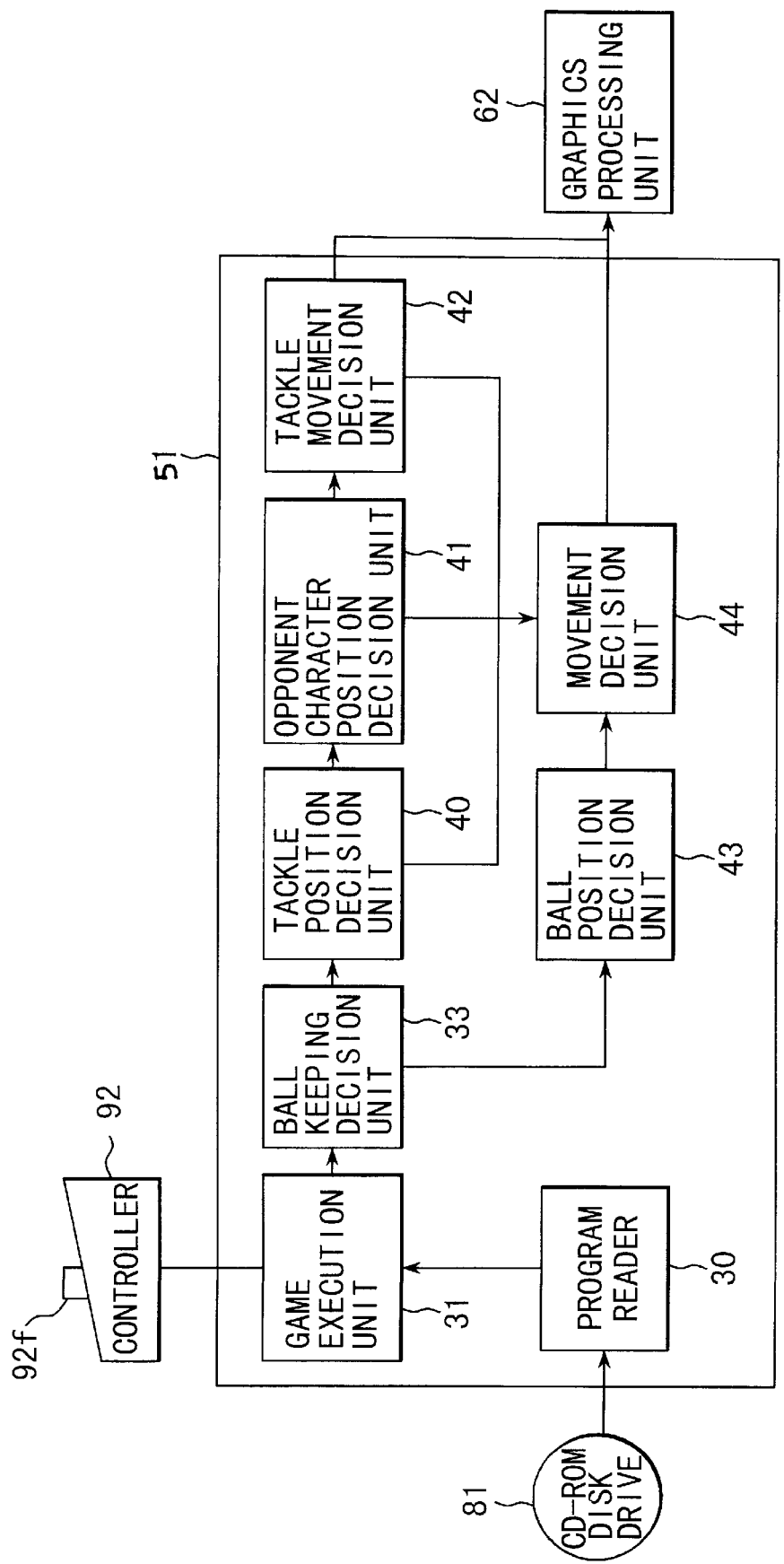
FIG. 2 is a block diagram of functions that can be performed by a central processing unit in the video game machine shown in FIG. 1.

Functions that are performed by the CPU 51 when the soccer game program is loaded from the CD-ROM played by the disk drive 81 into the main memory 53 will be described below with reference to FIG. 2. In FIG. 2, the CPU 51, the GPU 62, the manual controller 92, and the disk drive 81 are shown, and other hardware components shown in FIG. 1 are omitted from illustration.

As shown in FIG. 2, the functions performed by the CPU 51 include a program reader 30 for reading the soccer game program from the CD-ROM through the main memory 5, a game execution unit 31 for receiving the soccer game program read by the program reader 30 and also receiving information entered from the manual controller 92, a ball keeping decision unit 33 for receiving data from the game execution unit 31, a tackle position decision unit 40 for receiving data from the ball keeping decision unit 33, a ball position decision unit 43, an opponent character position decision unit 41 for receiving data from the tackle position decision unit 40, a tackle movement decision unit 42 for receiving data from the opponent character position decision unit 41, and a movement decision unit 44 for receiving data from the tackle position decision unit 40, the opponent character position decision unit 41, the tackle movement decision unit 42, and the ball position decision unit 43.

The game execution unit 31 executes the soccer game program received from the program reader 30 using data entered from the manual controller 92 as parameters. When the game execution unit 31 executes the soccer game program, the player's soccer team and the opponent soccer team compete for the soccer ball B in the soccer game space, and try to put the soccer ball B into the opponent's goal to obtain points. At this time, the movement of the player's game character M controlled by the game player is controlled on the basis of commands entered from the manual controller 92.

While the player's game character M is not keeping the soccer ball B, i.e., is defending, when the game player presses the fourth button 92f as the tackle button or ball capture start button to supply a ball capture start signal from the manual controller 92 to the game execution unit 31, the game execution unit 31 applies an interrupt start signal to the ball keeping decision unit 33.

In response to the interrupt start signal from the game execution unit 31, the ball keeping decision unit 33 determines whether any one of the opponent game characters is keeping the soccer ball B, i.e., whether the soccer ball B is free or not. If the soccer ball B is being kept by one of the opponent game characters, then the ball keeping decision unit 33 supplies a signal indicating that the soccer ball B is being kept by one of the opponent game characters to the tackle position decision unit 40. If the soccer ball B is not being kept by any one of the opponent game characters, then the ball keeping decision unit 33 supplies a signal indicating that the soccer ball B not is being kept by any one of the opponent game characters, i.e., the soccer ball B is free, to the ball position decision unit 43.

Figure 3:
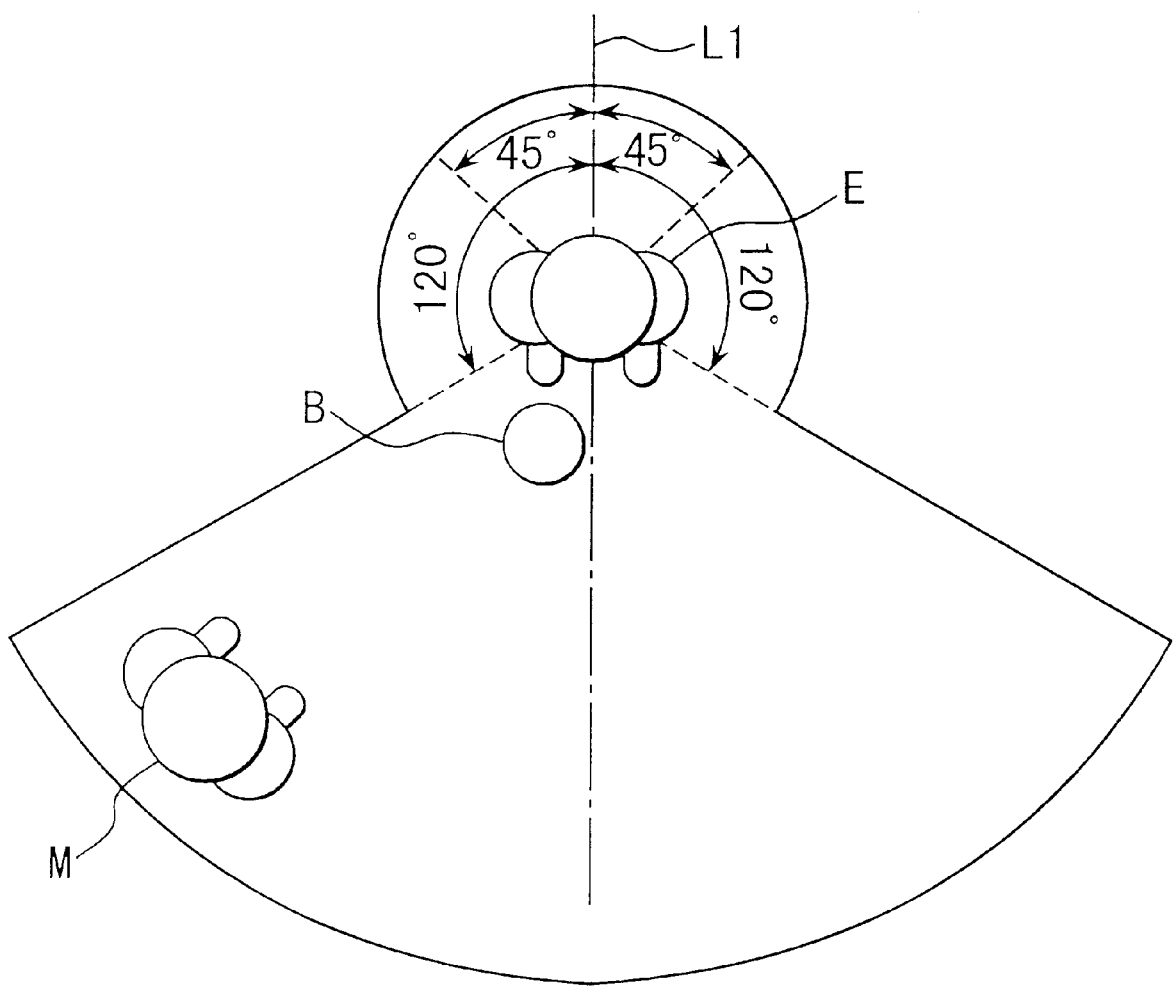
FIG. 3 is a diagram illustrative of the manner in which an opponent game character position decision unit, according to one of the functions shown in FIG. 2, determines the position of an opponent game character.

The tackle position decision unit 40 determines whether the player's game character M is in a position suitable for tackling the opponent game character which is keeping the soccer ball B, from its front, side, or rear. specifically, the tackle position decision unit 40 determines whether the player's game character M is in a suitable tackling position or not as follows: If, as shown in FIG. 3, the player's game character M is in a range indicated by the solid lines, i.e., a circular range around the opponent game character E with a radius equal to three times the diameter of the soccer ball B from the center of the opponent game character E, and a sectorial range having an angular extent between 120° and 180° on each side of the opponent game character E from a hypothetical reference line L1 that extends backward from the center of the opponent game character E and having a radius equal to nine times the diameter of the soccer ball B from the center of the opponent game character E, then the tackle position decision unit 40 determines that the player's game character M is in a position suitable for tackling the opponent game character E, and indicates to the opponent character position decision unit 41 that the player's game character M is in a position suitable for tackling the opponent game character E. If the player's game character M is not positioned in the above tackling range, then the tackle position decision unit 40 indicates to the opponent character position decision unit 41 that the player's game character M is not positioned in the above tackling range.

In response to the supplied information from the tackle position decision unit 40, the opponent character position decision unit 41 (corresponding to a relative position detecting means) determines a relative positional relationship between the player's game character M and the opponent game character E. Specifically, the opponent character position decision unit 41 determines such a relative positional relationship as follows: If, as shown in FIG. 3, the player's game character M is in a sectorial range having an angular extent of 45° on each side of the opponent game character E from the hypothetical reference line L1 and having a radius equal to three times the diameter of the soccer ball B from the center of the opponent game character E, then the opponent character position decision unit 41 determines that the player's game character M is present behind the opponent game character E. If, as shown in FIG. 3, the player's game character M is in a sectorial range having an angular extent between 45° and 120° on each side of the opponent game character E from the hypothetical reference line L1 and having a radius equal to three times the diameter of the soccer ball B from the center of the opponent game character E, then the opponent character position decision unit 41 determines that the player's game character M is present laterally of the, opponent game character E. If, as shown in FIG. 3, the player's game character M is in a sectorial range having an angular extent between 120° and 180° on each side of the opponent game character E from the hypothetical reference line L1 and having a radius equal to nine times the diameter of the soccer ball B from the center of the opponent game character E, then the opponent character position decision unit 41 determines that the player's game character M is present in front of the opponent game character E. The opponent character position decision unit 41 supplies the determined relative positional relationship between the player's game character M and the opponent game character E to the tackle movement decision unit 42.

In response to the determined relative positional relationship supplied from the opponent character position decision unit 41, the tackle movement decision unit 42 performs movement processing and image processing to cause the player's game character M to tackle the opponent game character E from its front, side, or rear. Specifically, the tackle movement decision unit 42 supplies image processing commands to the GPU 62 for enabling the player's game character M to tackle the opponent game character E.

In response to a signal from the ball keeping decision unit 33, the ball position decision unit 43 determines whether the soccer ball B in its free state, i.e., whether the soccer ball B is present in the air in the game space. The ball position decision unit 43 also determines whether the player's game character M is present in a spot where the soccer ball B will fall. The ball position decision unit 43 supplies a determined result to the movement decision unit 44.

In response to the determined result from the ball position decision unit 43, the movement decision unit 44 performs movement processing and image processing to cause the player's game character M to move toward the soccer ball B. Specifically, if the movement decision unit 44 receives a determined result indicating that the soccer ball B is present in the air from the ball position decision unit 43, then the movement decision unit 44 supplies an image processing command to the GPU 42 for enabling the player's game character M to run toward the soccer ball B. If the movement decision unit 44 receives a determined result indicating that the player's game character M is not present in a spot where the soccer ball B will fall from the ball position decision unit 43, then the movement decision unit 44 supplies an image processing command to the GPU 42 for enabling the player's game character M to run toward that spot. If the movement decision unit 44 receives a determined result indicating that the player's game character M is present in a spot where the soccer ball B will fall from the ball position decision unit 43, then the movement decision unit 44 supplies an image processing command to the GPU 42 for enabling the player's game character M to face toward the direction in which the soccer ball B will come.

Figure 4:
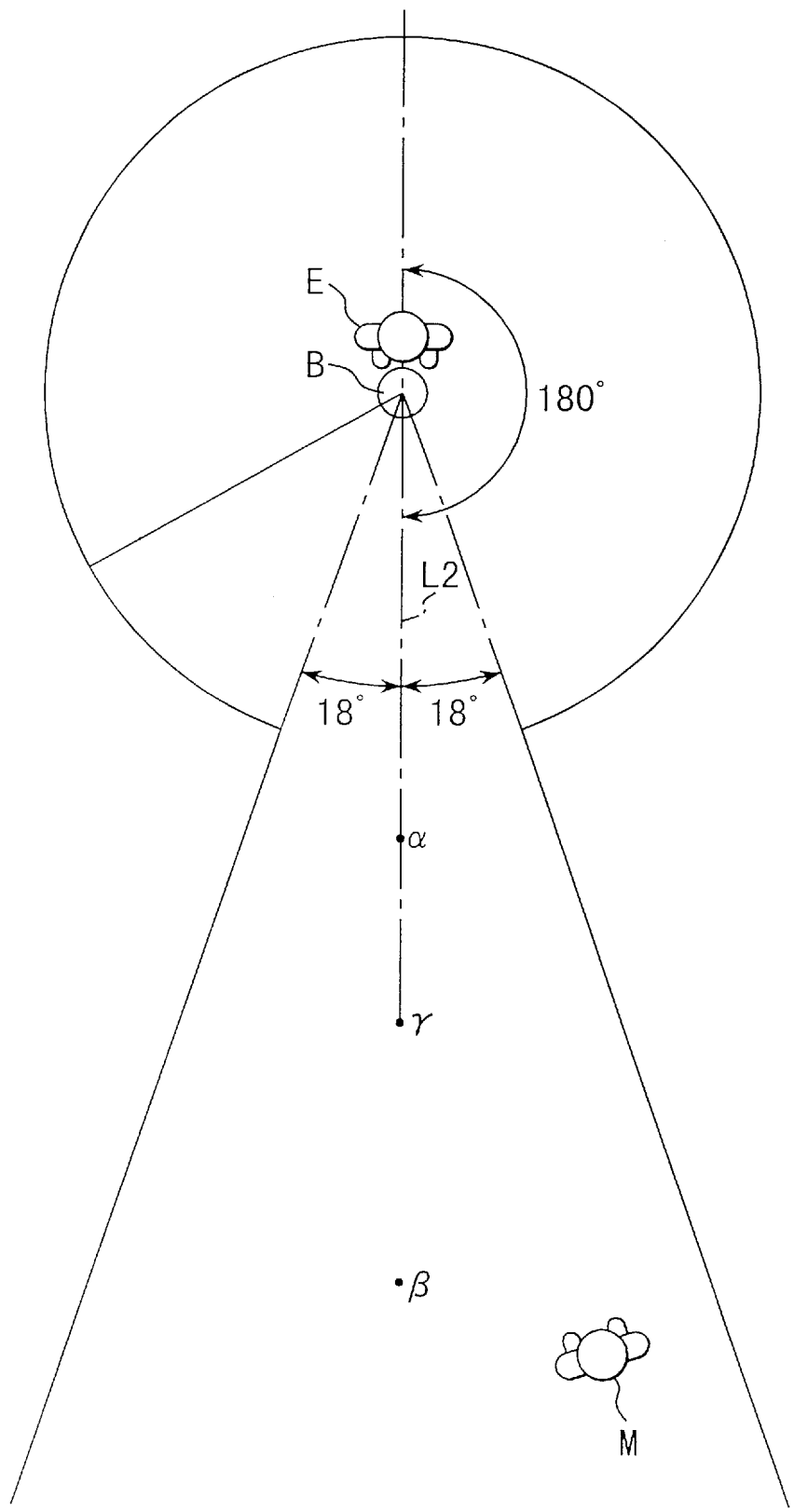
FIG. 4 is a diagram illustrative of the manner in which a movement decision unit, according to one of the functions shown in FIG. 2, determines a position.

For moving the player's game character M toward the soccer ball B, the movement decision unit 44 determines a position in the game space as a target to be reached by the player's game character M. A process of determining the position in the game space as a target to be reached by the player's game character M will be described below. As shown in FIG. 4, if the player's game character M is present in a range indicated by the solid lines, i.e., in a circular range around the center of the soccer ball B with a radius equal to eight times the diameter of the soccer ball B from the center of the soccer ball B, and an angular range of 18° on each side of a hypothetical reference line L2 that extends in the direction in which the soccer ball B moves at the start of the process, then the movement decision unit 44 calculates a position (that will be assumed by the soccer ball B 3/20 second later, and determines the calculated position $\alpha$ as a target to be reached by the player's game character M. If the player's game character M is not present in the above range, then the movement decision unit 44 determines whether the soccer ball B is being carried by an either one of the opponent game characters E. If the soccer ball B is not being carried by any one of the opponent game characters E, then the movement decision unit 44 calculates a position $\beta$ that will be assumed by the soccer ball B 5/20 second later, and determines the calculated position $\beta$ as a target to be reached by the player's game character M. If the soccer ball B is being carried by either one of the opponent game characters E, then the movement decision unit 44 calculates a position γ spaced from the opponent game character E that carries the soccer ball B by a distance about ten times the diameter of the soccer ball B in the direction in which the opponent game character E moves, and determines the calculated position y as a target to be reached by the player's game character M.

Figure 6:
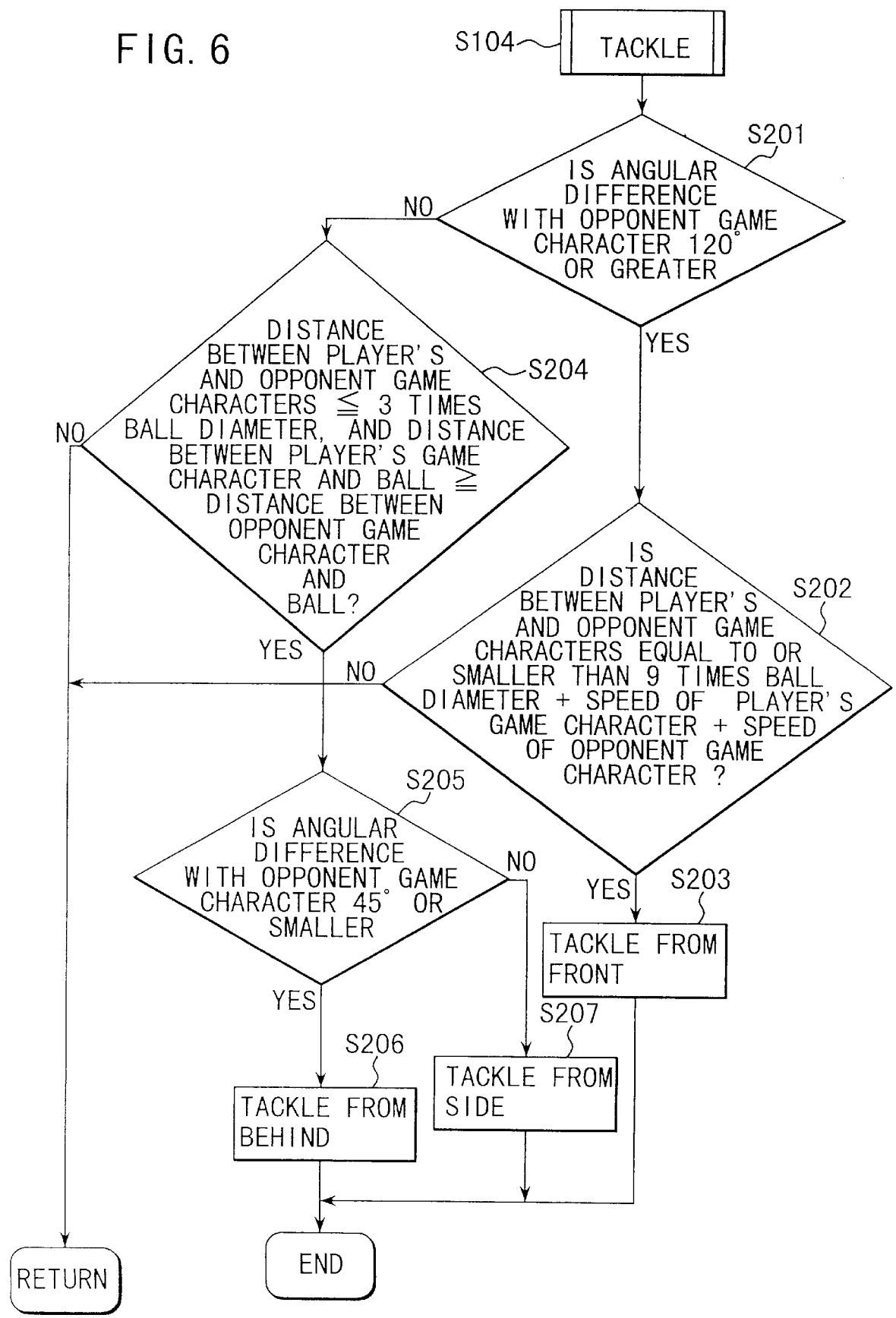
FIG. 6 is a flowchart of a processing sequence of a subroutine contained in the main routine shown in FIG. 5.
Figure 7:
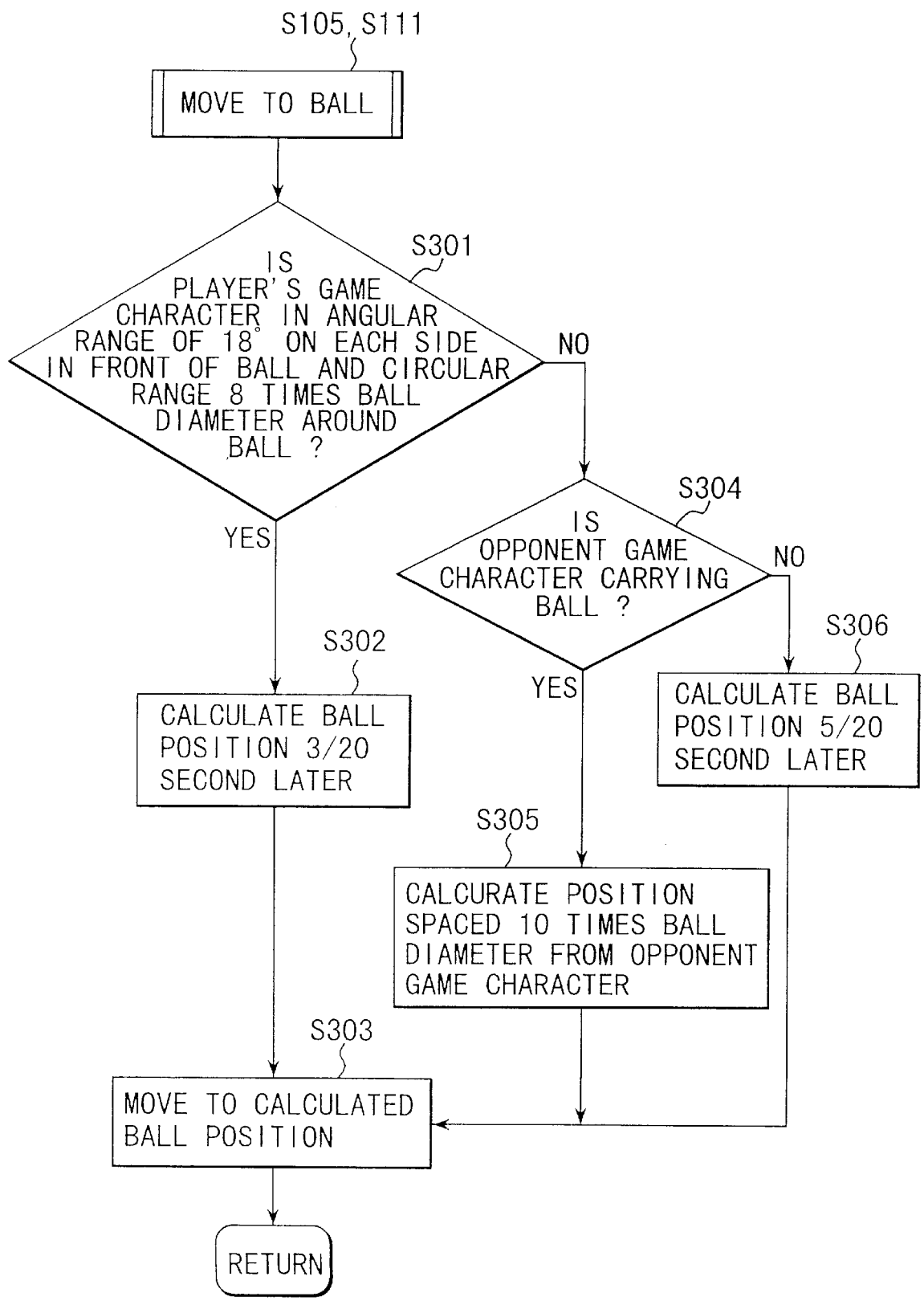
FIG. 7 is a flowchart of a processing sequence of another subroutine contained in the main routine shown in FIG. 5.

Operation of the video game machine described above will be described below with reference to FIGS. 5 through 7. It is assumed that the video soccer game is being normally processed by the game execution unit 31.

Figure 5:
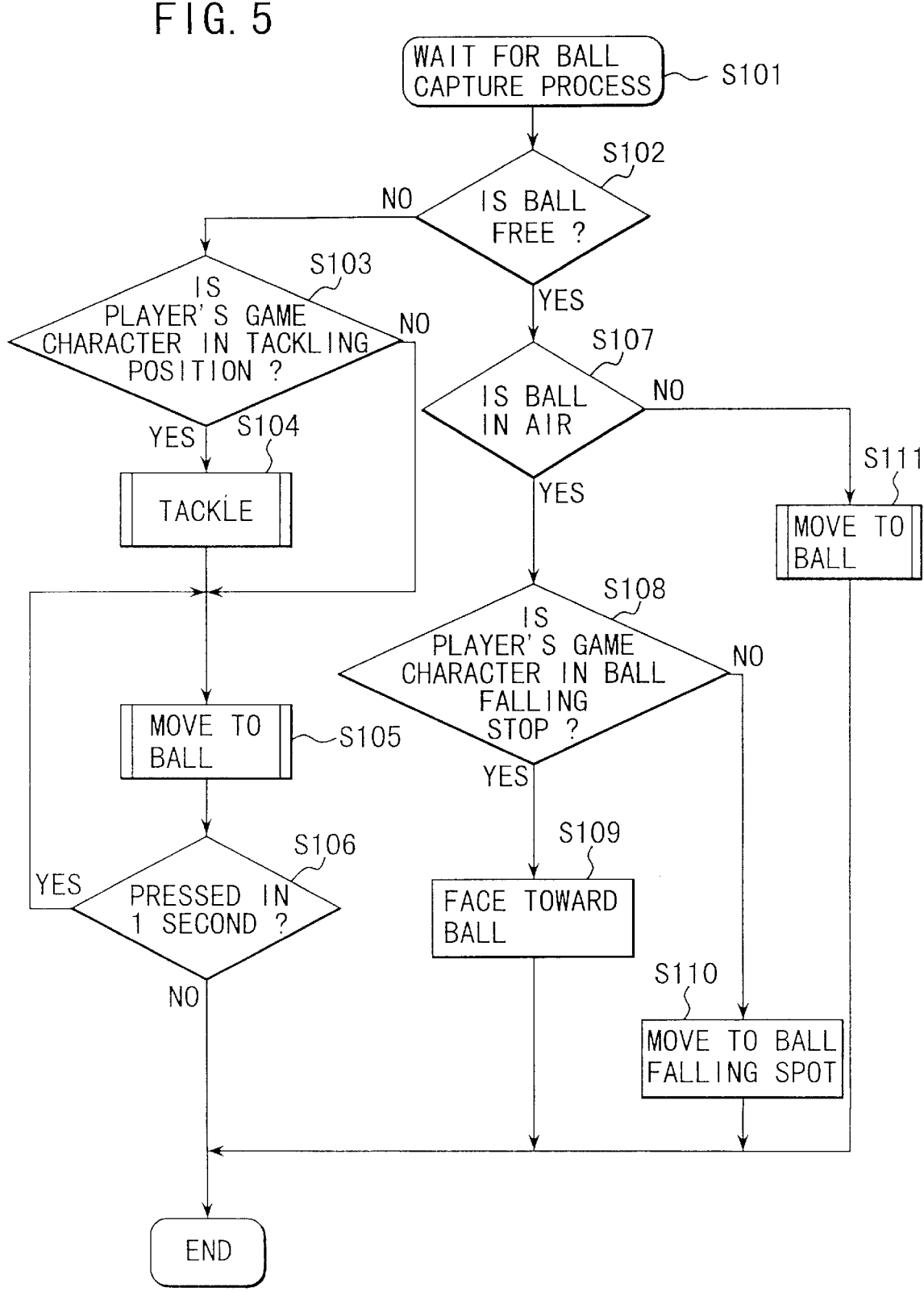
FIG. 5 is a flowchart of an overall processing sequence of a main routine that is executed by the central processing unit.

As shown in FIG. 5, the ball keeping decision unit 33 waits for an interrupt start signal from the game execution unit 31, i.e., waits for a ball capture process to start, in a step S101.

When the fourth button 92f is pressed as the ball capture start button while the player's game character M is not carrying the soccer ball B, the fourth button 92f supplies a ball capture start signal to the game execution unit 31. Then, the game execution unit 31 applies an interrupt start signal to the ball keeping decision unit 33. In response to the interrupt start signal, the ball keeping decision unit 33 determines whether the soccer ball B is in a free state, i.e., is not carried by any one of the opponent game characters in a step S102. If the soccer ball B is not in a free state, i.e., is carried by either one of the opponent game characters, then the ball keeping decision unit 33 gives that information to the tackle position decision unit 40, and control goes to a step S103. If the soccer ball B is in a free state, then the ball keeping decision unit 33 gives that information to the ball position decision unit 43, and control goes to a step S107.

In the step S103, the tackle position decision unit 40 determines whether the player's game character M is in a position suitable for tackling the opponent game character E which is keeping the soccer ball B or not. If the player's game character M is in a position suitable for tackling the opponent game character E, then the tackle position decision unit 40 gives that information to the opponent character position decision unit 41, and control goes to a step S104. If the player's game character M is not in a position suitable for tackling the opponent game character E, then the tackle position decision unit 40 supplies that information to the opponent character position decision unit 41, and control goes to a step S105.

In the step S104, a tackling process is carried out. The tackling process in the step S104 is defined as a subroutine shown in FIG. 6. As shown in FIG. 6, the opponent character position decision unit 41 determines in a step S201 whether or not an angular difference between the player's game character M and the opponent game character E is 120° or greater, i.e., whether or not the player's game character M is present in the angular range between 120° and 180° on each side of the opponent game character E from the hypothetical reference line L1, as shown in FIG. 3. If the player's game character M is present in that angular range, then control proceeds to a step S202. If the player's game character M is not present in that angular range, then control proceeds to a step S204.

In the step S202, the opponent character position decision unit 41 determines whether or not the distance between the player's game character M and the opponent game character E is equal to or smaller than a value calculated according to the following equation:

(the diameter of the ball B×9)+(the speed of the player's game character M+the speed of the opponent game character E)

If the opponent character position decision unit 41 determines that the distance between the player's game character M and the opponent game character E is equal to or smaller than the calculated value, then the opponent character position decision unit 41 supplies that information to the tackle movement decision unit 42, and control proceeds to a step S203. If the opponent character position decision unit 41 determines that the distance between the player's game character M and the opponent game character E is neither equal to nor smaller than the calculated value, then the opponent character position decision unit 41 supplies that information to the movement decision unit 44, and control goes to the step S105 (FIG. 5).

In the step S203, in response to the information from the opponent character position decision unit 41, the tackle movement decision unit 42 performs movement processing and image processing to cause the player's game character M to tackle the opponent game character E from its front. After the step S203, the interrupt process comes to an end, and control returns to the normal process carried out by the game execution unit 31.

When control proceeds from the step S201 to the step S204, the opponent character position decision unit 41 determines whether the opponent game character E is positioned closer to the soccer ball B than to the player's game character M and also the distance between the player's game character M and the opponent game character E is equal to or smaller than three times the diameter of the soccer ball B. This is to avoid the possibility that a tackle attempted when the above conditions are not met will be judged as a foul. If the above conditions are met, then control proceeds to a step S205. If the above conditions are not met, the opponent character position decision unit 41 supplies that information to the movement decision unit 44, and control goes to the step S105.

In the step S205, the opponent character position decision unit 41 determines whether an angular difference between the player's game character M and the opponent game character E is 45° or smaller, i.e., whether the player's game character M is present in the angular range of 45° on each side of the opponent game character E from the hypothetical reference line L1. If the player's game character M is present in the angular range, then the opponent character position decision unit 41 supplies that information to the tackle movement decision unit 42, and control goes to a step S206. If the player's game character M is not present in the angular range, then the opponent character position decision unit 41 supplies that information to the tackle movement decision unit 42, and control goes to a step S207.

In the step S206, in response to the information from the opponent character position decision unit 41, the tackle movement decision unit 42 performs movement processing and image processing to cause the player's game character M to tackle the opponent game character E which carries the soccer ball B from behind. After the step S206, the interrupt process comes to an end, and control returns to the normal process carried out by the game execution unit 31.

In the step S207, in response to the information from the opponent character position decision unit 41, the tackle movement decision unit 42 performs movement processing and image processing to cause the player's game character M to tackle the opponent game character E which carries the soccer ball B from its side. After the step S207, the interrupt process comes to an end, and control returns to the normal process carried out by the game execution unit 31.

In the step S105, a process of causing the player's game character M to run toward the soccer ball B carried by the opponent game character E is carried out. The process in the step S105 is defined as a subroutine shown in FIG. 7. As shown in FIG. 7, the movement decision unit 44 determines in a step S301 whether the player's game character M is present in the range shown in FIG. 4, i.e., whether the player's game character M is present in the circular range around the center of the soccer ball B with a radius equal to eight times the diameter of the soccer ball B from the center of the soccer ball B, and the angular range of 18° on each side of the hypothetical reference line L2 in the direction in which the soccer ball B moves. If the player's game character M is present in the range shown in FIG. 4, then control goes to a step S302. If the player's game character M is not present in the range shown in FIG. 4, then control goes to a step S304.

In the step S302, the movement decision unit 44 calculates a position α (see FIG. 4) that will be assumed by the soccer ball B 3/20 second later (the position α corresponds to the position of the soccer ball B in a third image frame since an image comprises 20 frames per second). Then, the movement decision unit 44 effects a process of causing the player's game character M1 to run toward the position a calculated in the step S302 in a step S303. Thereafter, control goes to a step S106.

In the step S304, the movement decision unit 44 determines whether the opponent game character E is carrying the soccer ball B or not. If the opponent game character E is carrying the soccer ball B, then control proceeds to a step S305. If the opponent game character E is not carrying the soccer ball B, then control proceeds to a step S306.

In the step S305, the movement decision unit 44 calculates a position γ (see FIG. 4) that is spaced from the opponent game character E by the distance equal to ten times the diameter of the soccer ball B in the direction in which the opponent game character E moves. Thereafter, the movement decision unit 44 effects a process of causing the player's game' character M to run toward the position γ in the step S303.

In the step S306, the movement decision unit 44 calculates a position β (see FIG. 4) that will be assumed by the soccer ball B 5/20 second later (the position β corresponds to the position of the soccer ball B in a fifth image frame). Then, the movement decision unit 44 effects a process of causing the player's game character M to run toward the position β in the step S303. Thereafter, control goes to the step S106.

In the step S106, the movement decision unit 44 determines whether the fourth button 92f has been pressed or not in about 1 second from the start of the step S106. If the fourth button 92f has been pressed in about 1 second, then control goes back to the step S105. If the fourth button 92f has not been pressed in about 1 second, then a time-out occurs, and the interrupt process comes to an end, and control returns to the normal process carried out by the game execution unit 31.

If control goes from the step S102 to the step S107, then the ball position decision unit 43 determines whether the soccer ball B is in the air or not in the step S107. If the soccer ball B is in the air, then control proceeds to a step S108. If the soccer ball B is not in the air, then the ball position decision unit 43 supplies that information to the movement decision unit 44, and control proceeds to a step S111.

In the step S108, the ball position decision unit 43 determines whether the player's game character M is present in a spot where the soccer ball B will fall. If the player's game character B is in the spot where the soccer ball B will fall, the ball position decision, unit 43 supplies that information to the movement decision unit 44, and control proceeds to a step S109. If the player's game character M is not present in the spot where the soccer ball B will fall, the ball position decision unit 43 supplies that information to the movement decision unit 44, and control proceeds to a step S110.

In the step S109, in response to the information from the ball position decision unit 43, the movement decision unit 44 carries out a process of enabling the player's game character M to face toward the direction in which the soccer ball B will come.

In the step S110, in response to the information from the ball position decision unit 43, the movement decision unit 44 carries out a process of enabling the player's game character M to run toward the spot where the soccer ball B will fall. After the steps 109, 110, the interrupt process comes to an end, and control returns to the normal process carried out by the game execution unit 31.

In the step Sill, the same process as in the step S105, i.e., the process of causing the player's game character M to run toward the soccer ball B carried by the opponent game character E, is carried out. After the step S111, the interrupt process comes to an end, and control returns to the normal process carried out by the game execution unit 31.

Of the three patterns of tackling described above, the tackling from behind the opponent game character E and the tackling from the side of the opponent game character E are primarily for the purpose of blocking an dribbling action of the opponent game character E and also for the player's game character M to capture the soccer ball B from the opponent game character E with low probability. For the tackling from the front of the opponent game character E, ability values inherent in the player's game character M and ability values inherent in the opponent game character E are compared with each other, and whether the player's game character M can successfully capture the soccer ball B from the opponent game character E depends upon the result of comparison between those ability values. If the opponent game character E faces in a different direction while the player's game character M is attempting to tackle the opponent game character E, then the player's game character M cannot successfully capture the soccer ball B from the opponent game character E. When the player's game character M successfully captures the soccer ball B from the opponent game character E, the player's game character M may be allowed to dribble automatically until it is spaced from the opponent game character E by a predetermined distance.

With the video game machine and the storage medium which stores the video game program, if the game player presses the fourth button 92f (tackle button) while the opponent game character E is carrying the soccer ball B in the video soccer game, the player's game character M approaches the opponent game character E which is carrying the soccer ball B and automatically tackles the opponent game character E. If the game player presses the fourth button 92f while the soccer ball B is free, the player's game character M automatically runs toward the soccer ball B.

Therefore, even those game players who are not sufficiently skilled to control the player's game character M can enjoy the video soccer game sufficiently. Many game players which have been avoiding video ball games because of the difficulty in controlling the player's game character M will be interested in playing such video ball games.

In the illustrated embodiment, the opponent soccer team is controlled by the CPU 51. However, the opponent soccer team may be controlled by another game player who controls another manual controller that is connected to the video game machine. Even if two game players who play the video soccer game by controlling their respective soccer teams have different levels of skill for handling their manual controllers, they can easily operate the manual controllers to cause their game characters to automatically tackle opponent game characters. Consequently, the game players can enjoy the video soccer game well regardless of their different levels of skill for handling their manual controllers.

While the video soccer game program has been described as the video ball game program played on the video game machine, other video ball game programs such as a basketball game program, a hockey game program, etc. may be played on the video game machine.

Consequently, the video game machine and the storage medium which stores the video game program allow game players to enjoy video ball games irrespective of different levels of skill which the game players have in operating their manual controllers.

Although a certain preferred embodiment of the present invention has been shown and described in detail, it should be understood that various changes and modifications may be made therein without departing from the scope of the appended claims.

What is claimed is:

1. A video game machine for playing a video ball game in a virtual ball game space between two ball game teams imaged on a display wherein a game player controls a player's character of at least one of the two ball game team, comprising:

a manual controller having a directional input device for permitting the game player to input directional data for moving the player's character and a non-directional capture input for permitting the game player to input a ball capture signal for directing the player's character to capture a ball;

relative position detecting means for detecting means for detecting a relative position in the virtual game space between the player's character and the ball in response to the ball capture signal; and movement control means, responsive to the ball capture signal and the relative position, for advancing the player's character toward the ball when the player's character is spaced aport from the ball and the relative position between the player's character and the ball, as detected by said relative position detecting means, is within a predetermined range.

2. A video game machine according, to claim 1, wherein:

said relative position detecting means comprises means for detecting a relative distance between said player's character and said ball and a direction of a position of said player's character with respect to a direction of movement of said ball; and said movement control means comprises means for advancing said player's character to capture the ball depending on the said relative distance and said direction of the position of said player's character as detected by said relative position detecting means.

3. A video game machine according to claim 1, wherein said movement control means comprises:

means for advancing said player's character to capture the ball in a first pattern if said relative distance is within a predetermined distance range and said direction of the position of said player's character is angularly deviated from said direction of movement of said ball by a first angle within a first angular range; and means for advancing said player's character to capture the ball in a second patterns, different from said first pattern, if said relative distance is within said predetermined distance range and said direction of the position of said player's character is angularly deviated from said direction of movement of said ball by a second angle within a second angular range different from said first angular range.

4. A video game machine according to any one of claims 1 through 3, wherein said movement control means comprises means for causing said player's character to capture the ball from an opposing character belonging to the other of said two ball game teams if said opposing character is present near said ball.

5. A video game machine according to any one of claims 1 through 3, further comprising:

ball state detecting means for detecting whether said ball is in air; and said movement control means comprises means for causing said player's character to capture the ball depending on a result detected by said ball state detecting means.

6. A method of processing image data in a video game machine for playing a video ball game in a virtual ball game space between two ball game teams imaged on a display wherein a game player controls a player's character of at least one of the two ball game teams, comprising the steps of:

permitting the game player to input directional data for moving the player's character and non-directional data in the form of a ball capture signal for directing the player's character to capture a ball;

detecting a relative position in the virtual game space between the player's character and the ball in response to the ball capture signal; and advancing the player's character, in response to the ball capture signal and the relative position, toward the ball when the player's character is spaced apart from the ball and the detected relative position between the player's character and the ball is within a predetermined range.

7. A storage medium storing executable code of a video ball game program for playing a video ball game in a virtual ball game space between two ball game teams imaged on a display wherein a game player controls a player's character of at least one of the two ball game teams, said video ball game program comprising the steps of:

permitting the game player to input directional data for moving the player's character and non-directional data in the form of a ball capture signal for directing the player's character to capture a ball;

detecting a relative position in the virtual game space between the player's character and the ball in response to the ball capture signal; and advancing the player's character, in response to the ball capture signal and the relative position, toward the ball when the player's character is spaced apart from the ball and the detected relative position between the player's character and the ball is within a predetermined range.

8. A storage medium storing executable code of a video ball game program for playing a video ball game in a virtual ball game space between two ball game teams imaged on a display wherein a game player controls a player's character of at least one of the two ball game teams, said video ball game program comprising the steps of:

permitting the game player to input directional data for moving the player's character and non-directional data in the form of a ball capture signal for directing the player's character to capture a ball;

detecting a relative position between the player's character and an opposing character belonging to another of said two ball game teams and which is in possession of the ball, in response to the ball capture signal; and advancing the player's character, in response to the ball capture signal and the relative position, to capture the ball when the player's character is spaced apart from the opposing character and the detected relative position between the player's character and the opposing character is within a predetermined range.

9. A video game machine for playing a video ball game in a virtual ball game space between two ball game teams imaged on a display wherein a game player controls a player's character of at least one of the two ball game teams, comprising:

a manual controller having a directional input device for permitting the game player to input directional data for moving the player's character and a non-directional capture input for permitting the same player to input a ball capture signal for directing the player's character to capture a ball;

relative position detecting means, responsive to a ball capture signal, for detecting a relative position between the player's character and an opposing character which belongs to another of said two ball game teams and which is in possession of the ball; and movement control means, responsive to said ball capture signal and the relative position, for advancing the player's character to capture the ball when the relative position between the player's character and the opposing character is within a predetermined range.

10. A storage medium storing executable code of a video ball game program for playing a video ball game in a virtual ball game space between two ball game teams imaged on a display wherein a game player controls a player's character of at least one of the two ball game teams, said video ball game program comprising the steps of:

permitting the game player to input directional data for moving the player's character and non-directional data in the form of a ball capture signal for directing the player's character to capture a ball;

detecting, in response to the ball capture signal, a relative position between the player's character and an opposing character which belongs to another of said two ball game teams and which is in possession of the ball; and advancing the player's character, in response to the ball capture signal and the relative position, to capture the ball when the relative position between the player's character and the opposing character is within a predetermined range.

11. A method of image processing for a video game played in a virtual game space between two game teams, each having at least one character, imaged on a display wherein a game player controls a player's character of one of the two game teams to compete against an opposing character of another of the two game teams, comprising the steps of:

accepting from the game player directional data input and non-directional input for directing movement of the player's character in the virtual game space;

detecting, in response to the non-directional input, a relative position in the virtual game space of the player's character with respect to the opposing character; and advancing the player's character, in response to the non-directional input, toward the opposing character when the player's character is spaced apart from the opposing character and the detected relative position between the player's character and the opposing character is within a predetermined range.

12. The method of claim 11 wherein said advancing the player's character toward the opposing character includes actuating the player's character to tackle the opposing character.

13. The method of claim 11 wherein:

said detecting said relative position includes determining a player to player distance between the player's character and the opposing character and angular orientation of the player's character relative to the opposing character;

said advancing the player's character includes actuating the player's character to tackle the opposing character using a first tackle movement when the player to player distance is within a first distance range and the angular orientation is within a first angular range; and said advancing the player's character includes actuating the player's character to tackle the opposing character using a second tackle movement when the player to player distance is within a second distance range and the angular orientation is within a second angular range.

14. The method of claim 11 wherein:

said detecting said relative position includes determining a player to player distance between the player's character and the opposing character and angular orientation of the player's character relative to the opposing character;

said advancing the player's character includes actuating the player's character to tackle the opposing character using a first tackle movement when the player to player distance is within a predetermined distance range and the angular orientation is within a first angular range; and said advancing the player's character includes actuating the player's character to tackle the opposing character using a second tackle movement when the player to player distance is within the predetermined distance range and the angular orientation is within a second angular range.

15. The method of claim 11 wherein:

said detecting said relative position includes determining a player to player distance between the player's character and the opposing character and angular orientation of the player's character relative to the opposing character;

said advancing the player's character includes actuating the player's character to tackle the opposing character using a first tackle movement when the player to player distance is within a first distance range and the angular orientation is within a first angular range;

said advancing the player's character includes actuating the player's character to tackle the opposing character using a second tackle movement when the player to player distance is within the first distance range and the angular orientation is within a second angular range; and said advancing the player's character includes actuating the player's character to tackle the opposing character using a third tackle movement when the player to player distance is within a second distance range and the angular orientation is within a third angular range.

16. A method of image processing for a video game played in a virtual game space between two game teams, each having at least one character, imaged on a display wherein the two game teams compete for control of a game object and a game player controls a player's character of one of the two game teams to compete against an opposing character of another of the two game teams, comprising the steps of:

accepting from the game player directional data input and non-directional input for directing movement of the player's character in the virtual game space;

detecting, in response to the non-directional input, whether the opposing player is in possession of the game object;

detecting, in response to the non-directional input, a relative position in the virtual game space of the player's character with respect to the opposing character; and advancing the player's character, in response to the non-directional input and detection that the opposing character is in possession of the game object, toward the opposing character when the player's character is spaced apart from the opposing character and the detected relative position between the player's character and the opposing character is within a predetermined range.

17. The method of claim 16 wherein said advancing the player's character toward the opposing character includes actuating the player's character to execute a tackle movement on the opposing character.

18. The method of claim 17 further comprising awarding possession of the game object to the player's character following the tackle movement.

19. The method of claim 17 further comprising awarding possession of the game object to the player's character following the tackle movement based on a probability determined in accordance with the relative position in the virtual game space of the player's character with respect to the opposing character prior to the tackle movement.

20. The method of claim 16 wherein:

said detecting said relative position includes determining a player to player distance between the player's character and the opposing character and angular orientation of the player's character relative to the opposing character;

said advancing the player's character includes actuating the player's character to tackle the opposing character using a first tackle movement when the player to player distance is within a first distance range and the angular orientation is within a first angular range; and said advancing the player's character includes actuating the player's character to tackle the opposing character using a second tackle movement when the player to player distance is within a second distance range and the angular orientation is within a second angular range.

21. The method of claim 20 further comprising awarding possession of the game object to the player's character following the tackle movement.

22. The method of claim 20 further comprising awarding possession of the game object to the player's character following the tackle movement based on a probability determined by which one the first tackle movement and second tackle movement is effected.

23. A method of image processing for a video game played in a virtual game space between two game teams, each having at least one character, imaged on a display wherein a game player controls a player's character of one of the two game teams to compete against an opposing character of another of the two game teams, comprising the steps of:

accepting from the game player directional data input and non-directional input for directing movement of the player's character in the virtual game space;

detecting, in response to the non-directional input, a relative position in the virtual game space of the player's character with respect to the game object; and advancing the player's character, in response to the non-directional input, toward a future position of the game object when the detected relative position between the player's character and the game object is within a predetermined range.

24. The method of claim 23 wherein said advancing the player's character includes advancing the player's character toward another future position of the game object when the detected relative position between the player's character and the game object is outside the predetermined range.

25. The method of claim 24 wherein:

said detecting said relative position includes determining a player to game object distance between the player's character and the game object; and said predetermined range includes circle of a predetermined diameter with a center at the game object.

26. The method of claim 25 wherein:

said detecting said relative position includes determining an angular orientation of the player's character relative to a movement direction of the game object; and said predetermined range further includes an angular sector extending outward from the game object and centered on the movement direction of the game object.

27. The method of claim 24 wherein:

said detecting said relative position includes determining an angular orientation of the player's character relative to a movement direction of the game object; and said predetermined range further includes an angular sector extending outward from the game object and centered on the movement direction of the game object.

28. The method of claim 23 wherein:

said detecting said relative position includes determining a player to game object distance between the player's character and the game object; and said predetermined range includes circle of a predetermined diameter with a center at the game object.

29. The method of claim 28 wherein:

said detecting said relative position includes determining an angular orientation of the player's character relative to a movement direction of the game object; and said predetermined range further includes an angular sector extending outward from the game object and centered on the movement direction of the game object.

30. The method of claim 23 wherein:

said detecting said relative position includes determining an angular orientation of the player's character relative to a movement direction of the game object; and said predetermined range further includes an angular sector extending outward from the game object and centered on the movement direction of the game object.

31. A method of image processing for a video game played in a virtual game space between two game teams, each having at least one character, imaged on a display wherein a game player controls a player's character of one of the two game teams to compete against an opposing character of another of the two game teams, comprising the steps of:

accepting from the game player directional data input and non-directional input for directing movement of the player's character in the virtual game space;

detecting, in response to the non-directional input, a relative position in the virtual game space of the player's character with respect to the game object;

detecting, in response to the non-directional input, whether the opposing player is in possession of the game object;

advancing the player's character, in response to the non-directional input, toward a first future position of the game object when the detected relative position between the player's character and the game object is within a predetermined range; and advancing the player's character, in response to the non-directional input, toward a second future position of the game object when the detected relative position between the player's character and the game object is outside the predetermined range and the opposing player is detected as not having possession of the game object.

32. The method of claim 31 further comprising advancing the player's character, in response to the non-directional input, toward a third future position of the game object when the detected relative position between the player's character and the game object is outside the predetermined range and the opposing player is detected as having possession of the game object.

33. A method of image processing for a video game played in a virtual game space between two game teams, each having at least one character, imaged on a display wherein a game player controls a player's character of one of the two game teams to compete against an opposing character of another of the two game teams, comprising the steps of:

accepting from the game player directional data input and non-directional input for directing movement of the player's character in the virtual game space;

detecting, in response to the non-directional input, a relative position in the virtual game space of the player's character with respect to the game object;

detecting, in response to the non-directional input, whether the opposing player is in possession of the game object;

advancing the player's character, in response to the non-directional input, toward a first future position of the game object when the detected relative position between the player's character and the game object is within a predetermined range; and advancing the player's character, in response to the non-directional input, toward a second future position of the game object when the detected relative position between the player's character and the game object is outside the predetermined range and the opposing player is detected as having possession of the game object.

34. A method of image processing for a video game played in a virtual game space between two game teams, each having at least one character, imaged on a display wherein the two game teams compete for control of a game object and a game player controls a player's character of one of the two game teams to compete against an opposing character of another of the two game teams, comprising the steps of:

accepting from the game player directional data input and non-directional input for directing movement of the player's character in the virtual game space;

detecting, in response to the non-directional input, whether the opposing player is in possession of the game object and executing the following steps upon a positive determination:

detecting a relative position in the virtual game space of the player's character with respect to the opposing character;

determining if the detected relative position between the player's character and the opposing character is within a predetermined tackle range when the player's character is spaced apart from the opposing character, and executing the following steps upon a positive determination:

advancing the player's character toward the opposing character; and actuating the player's character to execute a tackle movement on the opposing character;

detecting a relative position of the player's character with respect to the game object;

determining whether the detected relative position between the player's character and the game object is within a predetermined advancement range which is larger than said predetermined tackle range; and advancing the player's character toward a future position of the game object when it is determined that the detected relative position between the player's character and the game object is within a predetermined advancement range which is larger than said predetermined tackle range.

35. The method of claim 34 further comprising awarding possession of the game object to the player's character following the tackle movement based on a probability determined in accordance with the relative position in the virtual game space of the player's character with respect to the opposing character prior to the tackle movement.

36. The method of claim 34 further comprising awarding possession of the game object to the player's character following the tackle movement.

37. The method of claim 34 further comprising advancing the player's character toward another future position of the game object when it is determined that the detected relative position between the player's character and the game object is outside the predetermined advancement range.

38. The method of claim 34 wherein:

said detecting said relative position of the player's character with respect to the game object includes determining a player to game object distance between the player's character and the game object; and said predetermined advancement range includes circle of a predetermined diameter with a center at the game object.

39. The method of claim 38 wherein:

said detecting said relative position of the player's character with respect to the game object includes determining an angular orientation of the player's character relative to a movement direction of the game object; and said predetermined advancement range further includes an angular sector extending outward form the game object and centered on the movement direction of the game object.

40. The method of claim 34 wherein:

said detecting said relative position of the player's character with respect to the game object includes determining an angular orientation of the player's character relative to a movement direction of the game object; and said predetermined advancement range includes an angular sector extending outward form the game object and centered on the movement direction of the game object.

* * * * *